United States Patent [19]

Lorence et al.

[11] Patent Number: 4,854,536
[45] Date of Patent: Aug. 8, 1989

[54] CONTAINER HOLDER

[75] Inventors: Brian S. Lorence, Warren; David N. Grabowski, Rochester Hills, both of Mich.

[73] Assignee: Chivas Products Limited, Sterling Heights, Mich.

[21] Appl. No.: 175,555

[22] Filed: Mar. 31, 1988

[51] Int. Cl.⁴ .............................................. A47K 1/08
[52] U.S. Cl. ................................. 248/311.2; 297/194
[58] Field of Search ............... 248/311.2, 314; 211/71; 224/42.45 R; 297/188, 194, 154, 162; 312/242; 108/44

[56] References Cited

U.S. PATENT DOCUMENTS

| | | |
|---|---|---|
| 1,167,496 | 1/1916 | Harders ................. 156/DIG. 12 X |
| 1,301,913 | 4/1919 | Corby . |
| 2,000,916 | 5/1935 | Bloom ............................ 297/194 X |
| 2,862,625 | 12/1958 | Norris . |
| 3,039,616 | 6/1962 | Proffit . |
| 3,083,998 | 4/1963 | Morris . |
| 3,215,467 | 11/1965 | McFarland ........................ 297/194 |
| 3,497,076 | 2/1970 | O'Brien . |
| 3,637,184 | 1/1972 | O'Brien . |
| 3,784,142 | 1/1974 | O'Brien . |
| 4,040,659 | 8/1977 | Arnold . |
| 4,262,962 | 4/1981 | Yust .................................. 297/194 |
| 4,417,764 | 11/1983 | Marcus et al. . |
| 4,548,326 | 10/1985 | Danna .......................... 297/194 X |
| 4,589,711 | 5/1986 | Plank ............................ 312/242 X |
| 4,613,048 | 9/1986 | McGill ............................ 297/194 X |
| 4,719,764 | 1/1988 | Cook ............................... 297/194 X |
| 4,733,908 | 3/1988 | Dykstra ............................... 297/194 |
| 4,738,423 | 4/1988 | DiFilippo . |

Primary Examiner—J. Franklin Foss
Attorney, Agent, or Firm—Townsend and Townsend

[57] ABSTRACT

A container holder for use within a vehicle armrest includes a housing, mountable to an armrest support within the armrest, and a frame slidably mounted to the housing for movement between retracted and operational positions. A partially enclosed, C-shaped open area is defined within the frame to accommodate beverage containers such as cans and cups. The partially enclosed open area intersects a longitudinal edge of the frame. This enables the container holder to accommodate a container having a cross-sectional dimension greater than the width of the frame. A U-shaped support is pivotably mounted to and beneath the frame for vertically supporting the container. When the frame is retracted, the support automatically folds against the frame for storage.

14 Claims, 2 Drawing Sheets

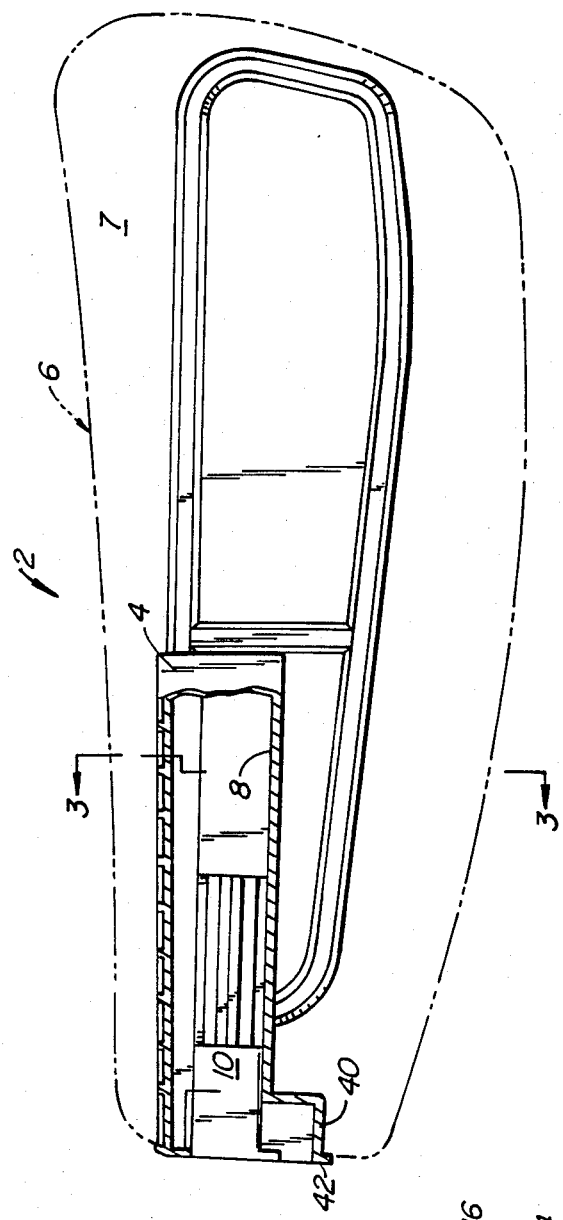
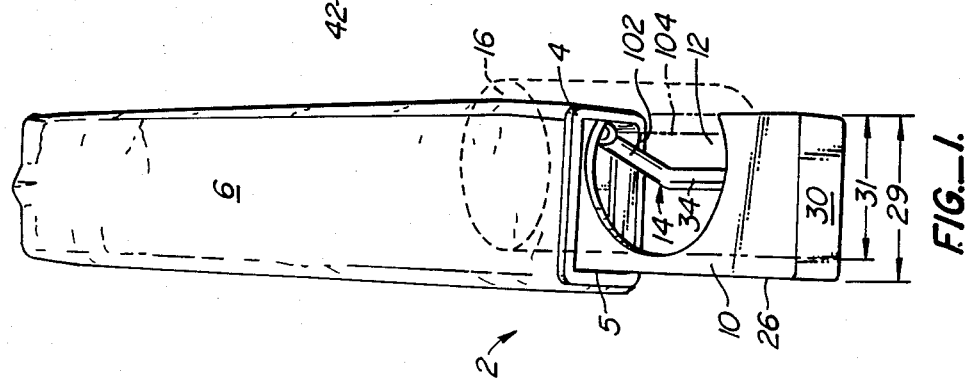
FIG._2A.
FIG._1.

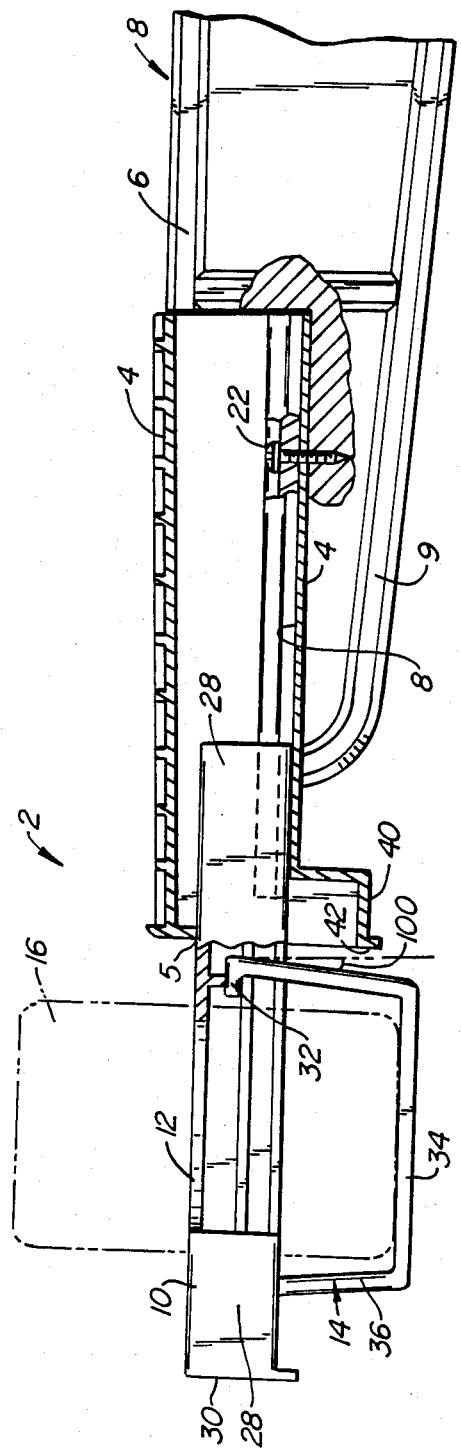
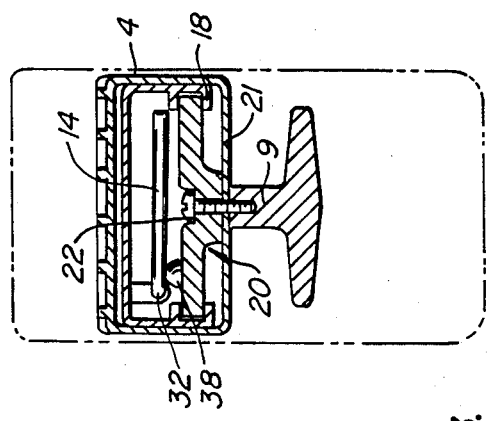

CONTAINER HOLDER

BACKGROUND OF THE INVENTION

Both drivers and passengers often drink beverages while travelling in a motor vehicle. One constant problem is where to put the cup, mug, can or other beverage container. Some automobiles have horizontal surfaces which can be used to support a beverage container; however, while the vehicle is in motion, the container is often likely to spill.

Numerous devices have been developed to properly support a beverage container, especially while the vehicle is in motion. Two such devices developed by the assignees of the present application are described in U.S. Pat. No. 4,738,423 dated Apr. 19, 1988 and U.S. patent application Ser. No. 138,988 filed Dec. 29, 1987, which are hereby incorporated by reference. These two devices generally include a frame having at least one central open area for receiving the container.

Another type of holder device is in the form of a cylindrical basket with a generally U-shaped hook at the top which engages the window opening. Still another type of holder device may be supported on the floor of the vehicle, typically on the drive shaft hump. Window opening and floor-supported container holders have the obvious disadvantage of being in the way when not needed.

Many holders are manufactured to accommodate a conventional soft drink can. Therefore, with conventional beverage container holders, if the container has an irregular configuration, for example, if the container has a handle protruding from its side, the container may not fit in the container holder. With an irregular container configuration, the user is often left with no satisfactory place for a beverage container.

SUMMARY OF THE INVENTION

The present invention is directed to a beverage container holder, particularly suited for use with motor vehicles for holding a container having a cross-sectional dimension greater than the width of the holder.

The container holder includes a housing secured to a support and a frame movably mounted to the housing. The housing is typically mounted within an armrest of a motor vehicle. It could also be mounted to a support within an opening in the instrument panel or center console or at the underside of the dashboard. The housing and frame are preferably slidably mounted to one another so that the frame is out of sight when in its retracted, storage position within the housing. When the frame is pulled to its extended, operational position, the frame exposes a partially enclosed open area for receiving the container. The open area, which in the preferred embodiment is C-shaped, intersects a longitudinal portion of the outer peripheral edge of the frame so as to be able to receive a container having a cross-sectional dimension greater than the width of the frame. The intersection of the opening with the longitudinal edge also allows containers, such as mugs, with handles to be supported by the container holder.

The container holder may include a bottom support pivotably mounted to and suspended from the frame. A part of the bottom support is positioned beneath the open area when the frame is in its operational position for vertically supporting the container placed in the open area.

Other features and advantages of the invention will appear from the following description in which the preferred embodiment has been set forth in detail in conjunction with the accompanying drawings.

BRIEF DESCRIPTION OF THE DRAWINGS

FIG. 1 is a perspective view of a container holder shown in its operational position and mounted within an automobile armrest, holding a container shown in dashed lines.

FIG. 2A is a partial cross-sectional view of the container holder, and associated armrest support structure of FIG. 1, in its retracted position with the padded portions of the armrest shown in dashed lines.

FIG. 2B is a cross-sectional view of the container holder and armrest support structure of FIG. 2A with the container holder in its operational position and a container shown in dashed lines.

FIG. 3 is a cross-sectional view taken through line 3—3 of FIG. 2A.

DETAILED DESCRIPTION OF THE PREFERRED EMBODIMENT

Referring now to the drawings, FIGS. 1 and 2A illustrate the container holder 2 mounted within armrest 6 of a motor vehicle (not shown). Container holder 2 includes a rectangular frame 10 disposed within elongated housing 4. A partially enclosed, C-shaped open area 12 is formed in frame 10 for receiving a container 16. Container holder 2 also includes a bottom support 14 hingedly attached to frame 10 for vertically supporting container 16 within frame 10. Housing 4 is mounted to a support 8 of armrest 6 and is surrounded by padding 7.

Referring now also to FIGS. 2B and 3, frame 10 is slidably mounted to housing 4 to move between a retracted position as shown in FIG. 2A and an operational position as shown in FIG. 2B. in which a container 16 is received in partially enclosed open area 12 of frame 10. Frame 10 includes U-shaped guides 18 sliding along a T-shaped fixed portion 20 of housing 4 between the retracted and the operational positions. Frame 10 slides horizontally out from arm rest 6 through an opening 5 in housing 4 such that container 16 is vertically supported within open area 12. T-shaped fixed portion 20 is secured to a mounting element 9 of support 8 with a bottom portion 21 of housing 4 captured between the two. Mounting element 9 has an inverted T-shape. Screw 22 extends through fixed portion 20, bottom portion 21 and into mounting element 9.

Frame 10 includes an outer peripheral edge 26 having longitudinal portions 28 and a transverse portion 30. Frame 10 has a length parallel to the longitudinal dimension of the frame and a width parallel to the transverse dimension 31 of open area 12. Partially enclosed open area 12 intersects one longitudinal portion 28 of outer peripheral edge 26, so that C-shaped open area 12 is partially enclosed by frame 10 and partially open to the environment. Container 16, shown in dashed lines in FIG. 1, has a cross-sectional dimension greater than the transverse direction 31 of open area 12 and, in fact, greater than the width 29 of frame 10. Thus, container holder 2 will accommodate a container having a cross-sectional dimension greater than the width of frame 10 as well as, in some cases, the width of armrest 6.

Bottom support 14 is pivotally mounted to frame 10 at pivot points 32 to allow movement between a generally vertically oriented support position as shown in FIGS. 1 and 2B and a generally horizontal collapsed position as shown in FIGS. 2A and 3.

Bottom support 14 includes horizontal leg 34 and generally vertically depending legs 36 supporting the horizontal leg. Vertically depending legs 36 and horizontal leg 34 are configured such that in the operational position, vertically depending legs 36 have a longitudinal angular offset 100, which can be seen in FIG. 2B, parallel to the direction of movement of frame 10, a line 104 see FIG. 1 connecting pivot points 32 is vertically above and laterally offset from horizontal leg 34 when bottom support 14 is in the operational position as shown in FIG. 2B. This results in a lateral angular offset 102, shown in FIG. 1, perpendicular to the direction of movement of frame 10.

As bottom support 14 slides to its retracted position, one of the vertically depending legs 36 abuts a lip 40 of housing 4 adjacent opening 5, to pivot bottom support 14 to its retracted position. That is, edge 42 of lip 40 acts as a camming surface to pivot bottom support 14 upwardly. Longitudinal and lateral angular offsets 100. 102 facilitate the pivotal movement of bottom support 14 to its retracted position as shown in FIGS. 2A and 3.

A raised portion 38, see FIG. 3, of portion 20 urges bottom support 14 to a position parallel to frame 10 when container holder 2 is in its retracted position.

In operation, container holder 2 is originally within housing 4 in its retracted position as shown in FIGS. 2A and 3. By pulling transverse portion 30 of frame 10 in a direction parallel to armrest 6, frame 10 is moved to its operational position as shown in FIGS. 1 and 2B. Guides 18 slide along fixed portion 20 from the retracted to the operational positions.

As bottom support 14 clears housing 4 the bottom support pivots about pivot points 32 from a position parallel to frame 10 to a generally vertical position in which vertically depending legs 36 are generally (but not totally) perpendicular to the plane of frame 10. In the fully operational position, horizontal leg 34 is positioned beneath the center of the circle defining partially enclosed C-shaped open area 12. Horizontal leg 34 is thus, aligned with the center of this circle. Container 16, with or without a handle, can then be placed within open area 12 and, if necessary, supported by leg 34 of bottom support 14.

Pushing frame 10 back into housing 4 causes the leg 34 closest to housing 4 to engage edge 42 of lip 40 at a compound angle so that lip 40 biases support 14 upwardly towards its generally horizontal, at rest position. When container holder 2 is in its retracted position, raised portion 38 urges bottom support to its position parallel to frame 10.

Modifications and variations can be made to the disclosed embodiment without departing from the subject of the invention as defined by the following claims. For example, frame 10 may have an arcuate shape which pivots from the retracted position to the operational position, rather than sliding in a straight line as shown n the drawings. Open area 12 would intersect the longitudinal outer peripheral edge such that the dimension parallel to movement is greater than the crosswise dimension which is generally, perpendicular thereto. Further, container holder 2 may be constructed without housing 4 so that frame 10 would be mounted directly to support 8.

We claim:

1. A beverage container holder for holding a beverage container, said container holder adapted to be mounted to an armrest support, the container having a transverse dimension, comprising:
    a frame supported by said support for movement between a retracted position and an operational, extended position; and
    said frame having an outer peripheral edge defining a longitudinal peripheral edge, said frame having a partially enclosed open area for receiving said container, said open area intersecting said longitudinal peripheral edge, said open area having a longitudinal dimension parallel to the movement of said frame and a transverse dimension perpendicular to the movement of said frame, the longitudinal dimension being greater than the transverse dimension so that the container which can be accommodated within said open area includes a cross-sectional dimension greater than the transverse dimension of the open area.

2. The container holder as defined by claim 1 wherein said frame is supported by a housing mountable to said support and wherein said frame is within said housing when said frame is in the retracted position and wherein said frame extends from said housing when said frame is in the operational position.

3. The container holder as defined by claim 1 wherein said open area comprises a C-shape.

4. The container holder as defined by claim 1 wherein said open area comprises a portion of a circle.

5. The container holder as defined by claim 1 further comprising a bottom support mounted to said frame, a part of said bottom support being positioned beneath said open area when said frame is in the operational position such that said container placed in said open area is supported vertically by sad bottom support.

6. The container holder as defined by claim 5 wherein said open area comprises a portion of a circle having a center of said circle, said part of said bottom support being aligned with said center of said circle.

7. The container holder as defined by claim 5, wherein said bottom support is pivotal between an operational position wherein said bottom support is depending from said frame when said frame is in the operational position and a retracted position wherein said bottom support is positioned generally parallel to said frame when said frame is in the retracted position.

8. The container holder as defined by claim 7 wherein said part of said bottom support comprises a horizontal leg parallel to the plane of the frame, and generally vertical legs generally perpendicular to the plane of the frame supporting said horizontal leg.

9. The container holder as defined by claim 1 wherein said frame includes guide means for guiding said movement between said frame and said housing.

10. The container holder as defined by claim 1 wherein the frame has a width and wherein the transverse dimension of the container is larger than the width of the frame.

11. A beverage container holder adapted to be mounted to an armrest support comprising:
    a housing mountable to said support;
    a frame supported by said housing for movement between a retracted position, wherein said frame is within said housing, and an operational position, wherein said frame extends from said housing:
    said frame having an outer peripheral edge, a length and a width:
    said frame having a portion defining a partially enclosed open area for receiving said container, said open area comprising a C-shaped portion of a circle intersecting said outer peripheral edge;

guides positioned within said housing, said frame being slidable along said guides between said operational and said retracted positions;

a bottom support for vertically supporting said container, said bottom support being mounted to said frame and being pivotal about pivot points positioned adjacent said outer peripheral edge between an operational position wherein said bottom support is depending from said frame when said frame is in the operational position and a retracted position wherein said bottom support is positioned parallel to said frame when said frame is in the retracted position: and said bottom support having a horizontal leg parallel to the plane of the frame positioned below said frame and being aligned with a diameter of said circle defining said open area.

12. A beverage container holder for holding a beverage container, said container holder adapted to be mounted to an armrest support, the container having a transverse dimension, comprising:

a frame supported by said support for movement between a retracted position and an operational, extended position;

said frame having an outer peripheral edge defining a longitudinal peripheral edge, said frame having a partially enclosed open area for receiving said container, said open area intersecting said longitudinal peripheral edge, said open area having a longitudinal dimension parallel to the movement of said frame and transverse dimension perpendicular to the movement of said frame, the longitudinal dimension being greater than the transverse dimension so that the container which can be accommodated within said open area includes a cross-sectional dimension greater than the transverse dimension of the open area;

a bottom support mounted to said frame, a part of said bottom support being positioned beneath said open area when said frame is in the operational position such that said container placed in said open area is supported vertically by said bottom support;

said bottom support being pivotal between an operational position, wherein said bottom support is depending from said frame when said frame is in the operational position, and a retracted position, wherein said bottom support is positioned generally parallel to said frame when said frame is in the retracted position;

said part of said bottom support comprising a horizontal leg parallel to the plane of the frame, and generally vertical legs generally perpendicular to the plane of the frame supporting said horizontal leg; and a generally horizontal camming surface positioned to engage at least one of the generally vertical legs of the bottom support as the frame moves towards the retracted position so to bias the bottom support towards the horizontal position.

13. The container holder as defined by claim 12 wherein the generally vertical legs pivot about pivot points attached to said frame and connected by a line, the line being horizontally offset from the horizontal leg when the bottom support is in the operational position so the generally vertical legs have a lateral angular offset with respect to vertical when in the operational position so as to aid pivotal movement of the bottom support upon contact with the camming surface.

14. A container holder adapted to be mounted to a support comprising:

a housing mountable to said support;

a frame supported by said housing for movement between a retracted position, wherein said frame is within said housing, and an operational position, wherein said frame extends from said housing;

said frame having an outer peripheral edge, a length and a width;

said frame having a portion defining a partially enclosed open area for receiving said container, said open area comprising a C-shaped portion of a circle intersecting said outer peripheral edge;

guides positioned within said housing, said frame being slidable along said guides between said operational and said retracted positions;

a bottom support for vertically supporting said container, said bottom support being mounted to said frame and being pivotal about pivot points positioned adjacent said outer peripheral edge between an operational position wherein said bottom support is depending from said frame when said frame is in the operational position and a retracted position wherein said bottom support is positioned parallel to said frame when said frame is in the retracted position;

said bottom support having a horizontal leg parallel to the plane of the frame positioned below said frame and being aligned with a diameter of said circle defining said open area; and the pivot points being connected by a line horizontally offset from the center of the circle defining the open area wherein said bottom support has a plurality of generally vertically depending legs supporting said horizontal leg, the generally vertically depending legs having a lateral angular offset when in the operational position so to aid pivotal movement of the bottom support to the retracted position.

* * * * *